19-55.B 52 3 BEST AVAILABLE COPY

R. A. L. McCURDY.

Cotton Gin.

No. 736. Reissued June 14, 1859.

Witnesses:
L. S. Brown.
R. F. Bigood.

Inventor:
David G. Khosha.

N. PETERS, Photo-Lithographer, Washington, D. C.

UNITED STATES PATENT OFFICE.

DAVID G. OLMSTED, OF VICKSBURG, MISS., ASSIGNEE OF R. A. L. McCURDY.

IMPROVEMENT IN COTTON-GINS.

Specification forming part of Letters Patent No. 13,131, dated June 26, 1855; Reissue No. 379, dated July 15, 1856; Reissue No. 736, dated June 14, 1859.

*To all whom it may concern:*

Be it known that R. A. L. McCURDY, of Sabine parish, in the State of Louisiana, did invent a new and useful Improvement in Cotton-Gins; and I, D. G. OLMSTED, of Vicksburg, in the county of Warren and State of Mississippi, assignee of all the right, title, and interest in and to said invention, do hereby declare that the following is a full and exact description thereof, reference being had to the accompanying drawings, making part of this specification—

Figure 1:
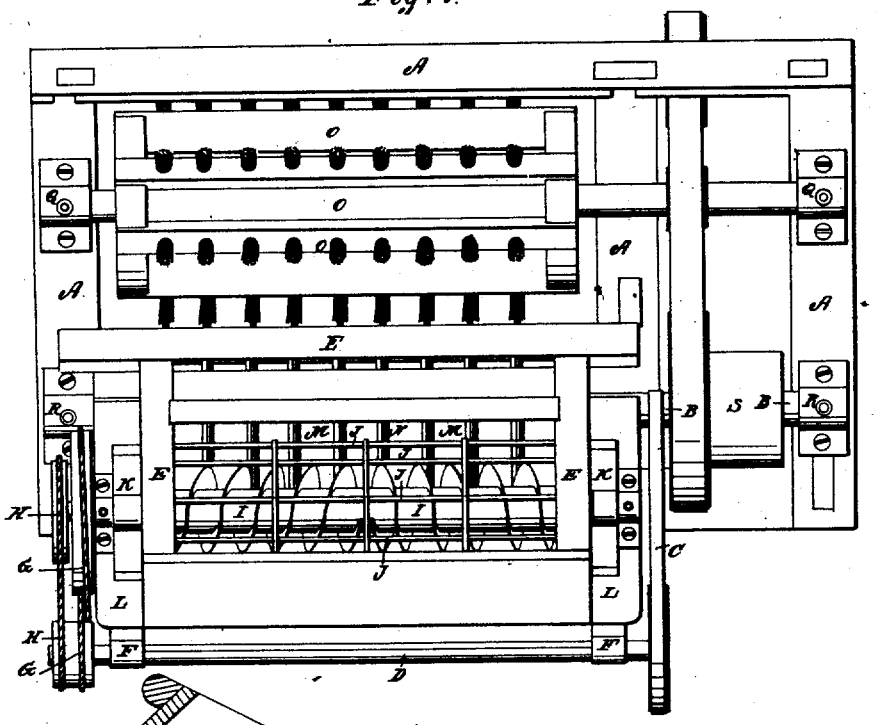
Figure 2:
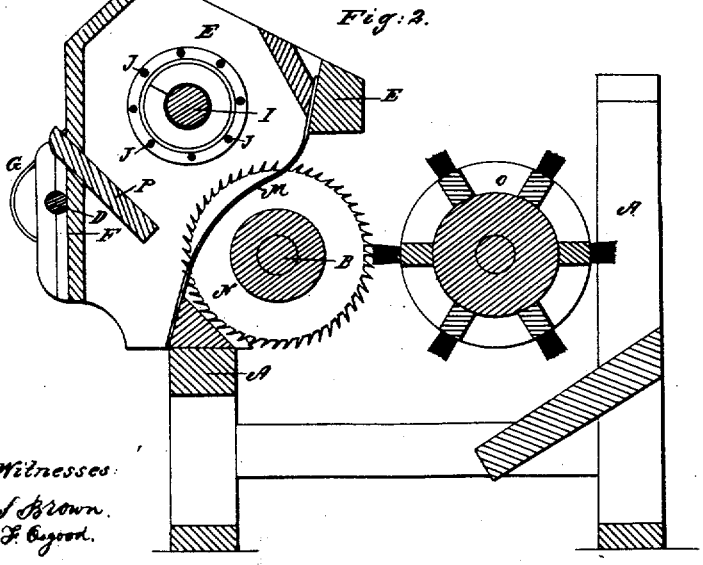

Figure 1 being a plan of a cotton-gin constructed with the aforesaid improvement, and Fig. 2 a transverse vertical section thereof.

Like letters designate corresponding parts in both figures.

The nature of the invention consists in the employment of a rotary screen or separator placed lengthwise in the middle of the hopper or "roll-box," so that the "roll" will revolve around it for the principal purpose of separating the boll-hulls from the roll and discharging them from the machine.

The main object of this improvement is to enable "rough cotton," or cotton picked with the bolls, to be easily and rapidly ginned without injury to the same, and to produce a good quality of cotton therefrom—results which have not hitherto been accomplished by any other cotton-gin within my knowledge.

The parts of the machine not having immediate connection with this improvement, nor having unusual action, may be constructed in any usual manner. These parts comprise, principally, the frame A, saws N, ribs M, and stripping-brush O.

Lengthwise in the middle of the roll-box, or so that the roll will pass around it, is situated the screen or separator, the main functions of this screen being, first, to separate the hulls from the middle of the roll, and, second, to discharge them from the machine. The construction of the screen may be such as to perform these functions by a united action, or by distinct actions. I generally make them distinct, and the accompanying drawings represent a convenient arrangement in that mode.

There are for the separating device two heads, K K, with central boxes or hubs prolonged outward at each end, so as to form hollow shafts or journals, turning in bearings L L. The hubs and rims or peripheries of these heads are connected by spokes or radial arms, so as to leave apertures between one another for the discharge of the hulls. The rims or peripheries of the two heads are connected by rods or slats J J, as represented in the drawings, placed round in a circle, so as to leave spaces between one another about seven-eighths of an inch wide, more or less. Rings, hoops, or disks may, at suitable intervals, extend transversely across or around these rods, in order to keep them firm in their proper positions. In the drawings a single cross-disk in the center and two intermediate rings between said disk and the heads are shown. It is obvious that these transverse circumferential rings or hoops may be placed near together, (seven-eighths of an inch apart, or thereabout,) and a few long rods run lengthwise, to connect the heads of the screen, and firmly unite all the rings together, as this would be a mere modification of the mode of construction represented. Other modes of construction might also be employed, such, for instance, as a cylindrical sheet-metal drum provided with numerous perforations of suitable size, or wire-cloth with suitable meshes.

The different methods of possible construction are mentioned in order to have it understood that the invention is not confined to any particular mode, but that the use of a revolving separator in the middle of the hopper or roll-box, or the equivalent thereof, is claimed. This screen or separator is situated near the center of the hopper or roll-box; but its position may vary considerably from the exact center, and generally it may be found to work even better if placed a little to one side of the center in such a manner as to facilitate the motion of the roll in relation to the action of the saws thereon, and the feeding in of more cotton, by contracting the space at those points, and thereby clogging the roll. As the screen or separator revolves with the cotton composing the roll compressed around it, the hulls which are innermost and in contact with the screen are forced therein through its meshes or openings, both by the pressure of the roll and the action of the saws, and thus, as the inner hulls are separated from the roll, the next outer hulls are brought into contact with the screen, while the fresh supplies of rough cotton are constantially added to the outside of the roll, the saws ginning away the lint as fast as the hulls are separated from the roll. When once inside of the screen the hulls cannot escape, except at the end or ends thereof, or at the outlets provided for the purpose. The proper motion is communicated to the screen in any convenient manner.

In the drawings there is represented a band, C, passing from the saw-shaft B round a transferring-shaft, D, situated at the front of the machine, and from the other end of said shaft another band, G, passes to a pulley on the shaft or journal of the screen.

For the discharging device I employ a shaft, I, placed concentrically within the revolving screen or separator, and provided with a spiral wing, or its equivalent, which shall, by the revolution of the shaft, move the hulls endwise of the separator, and discharge them through the ends of said separator. The spaces between the adjacent coils of this spiral wing should be sufficiently wide to freely admit the hulls. It may coil the whole length in one direction, as shown in the drawings, so as to discharge the hulls all at one end; or it may coil part in one direction and part in the other direction, so as to discharge a portion of the hulls and trash at each end. Instead of a simple continuous strip of metal forming this spiral wing, any arrangement of teeth, or of any form of projection or projections arranged spirally on the shaft, or so as to perform the function of discharging the hulls lengthwise of the shaft by the revolution thereof, may be employed. This shaft is preferably driven in the direction opposite to that of the separator around it; but it may be driven in the same direction without much disadvantage. Its journals pass through the hollow journals of the separator, and on one end of it is a pulley, which receives a band, H, passing from the shaft D; or any other convenient mode of communicating the revolving motion to the shaft may be employed. If the outer cylindrical separator is not used, the coils of the wing, or its equivalent on this spiral wing shaft, should be arranged at the proper distances apart to admit the hulls between one another and exclude the cotton, and the shaft should be driven in the direction of the roll's motion.

In addition to the two principal functions above specified, this improvement also serves to facilitate the action of the saws in ginning by bringing the cotton more firmly and constantly to the saws, and giving a surer and steadier motion to the roll. This use of the device is especially valuable when the saws are dull, as in old cotton-gins; hence it is often profitable to place it in ordinary cotton-gins for ginning clean, as well as rough, cotton.

The bearings of the shaft-journals pertaining to this improvement are situated outside of the roll-box, leaving sufficient room inside between said bearings and the side of the cotton-gin to allow the hulls and trash to escape there, and apertures are made in the sides of the cotton-gin, around the screen, of sufficient size to allow the discharge of the hulls.

What is claimed as the above-described invention, and desired to be secured by Letters Patent, is—

1. The revolving screen, cylinder, or shaft situated in the hopper or roll-box, so that the roll moves around it, when constructed and arranged, substantially in the manner described, whether as a single or double device, so as to perform any or all of the functions, as herein specified.

2. Discharging the hulls and trash from the roll-box through the sides of the cotton-gin, as above set forth.

DAVID G. OLMSTED.

Witnesses:
J. S. BROWN,
R. F. OSGOOD.